June 2, 1970   J. F. HADWIN   3,516,011
AIR-COOLED LASER SYSTEM
Filed March 14, 1968
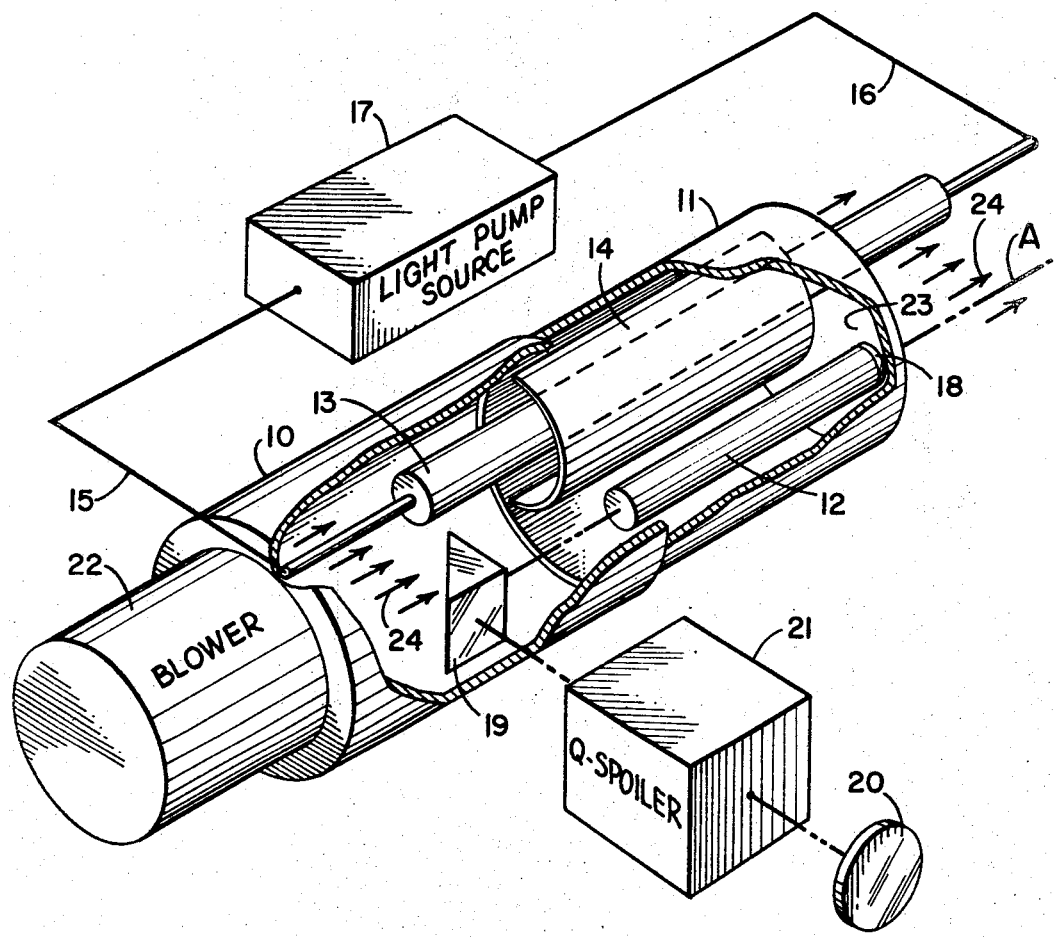
INVENTOR.
JAMES FREDERICK HADWIN
BY
Elliott & Pastoriza
ATTORNEYS

United States Patent Office 3,516,011
Patented June 2, 1970

---

3,516,011
AIR-COOLED LASER SYSTEM
James Frederick Hadwin, Manhattan Beach, Calif., assignor to Union Carbide Corporation, a corporation of New York
Filed Mar. 14, 1968, Ser. No. 713,198
Int. Cl. H01s 3/04
U.S. Cl. 331—94.5                                    7 Claims

ABSTRACT OF THE DISCLOSURE

A portable air-cooled Q-spoiled laser transmitter is provided utilizing yttrium aluminum garnet as the host crystal doped with neodymium. Regenerative means in the form of a 100% reflecting end mirror and dielectric coating are provided to define the optical cavity. In accord with the invention, a Rochon right angle prism is disposed along the optical axis of the laser material between one end of the material and the end mirror. This prism diverts the stimulated emission in the optical cavity in a right angle direction to define a generally L shaped cavity. An enclosure or plenum chamber surrounds the Rochon prism, laser material, and light pump therefor such that a portion of the L shaped optical cavity in line with the optical axis of the laser material is enclosed with the one regenerative end mirror being exterior to the chamber. A Q-spoiling means is also disposed in the exterior portion of the optical cavity between the prism and the one regenerative means. With this arrangement, a blower may direct cooling air through the chamber parallel to the axis of the laser material and thereby effect optimum cooling. The prism simultaneously effects polarization of the stimulated emission diverted to the exterior of the chamber so that Q-switching can be carried out by an electro-optical Q-spoiling means and thus enable generation of giant pulses.

---

This invention relates generally to laser systems and more particularly to an improved air-cooled portable laser.

Efficient operation of solid state laser systems generally requires cooling of the laser material. This cooling is normally carried out by utilizing a liquid coolant. However, certain laser materials have a sufficiently low threshold that air coolings is feasible. Air cooling has the advantage that the laser system can be readily made lighter since the auxiliary equipment necessary for liquid cooling is heavy and bulky.

Efficient cooling by means of air still poses some difficult problems. The major problem involves the optimum direction of air flow to effect maximum cooling. This direction should be along the optical axis of the laser material. However, most laser systems employ in-line geometry for the optical cavity such that any type of air cooling system heretofore proposed must direct the air towards the system at an angle to the optical axis with a consequent reduction in cooling effectiveness. In fact, it has been found that the miniature type air blowers necessary to provide a portable laser system simply are not sufficient to effect the necessary cooling when the air flow is directed in this manner.

Another difficulty in providing effective air cooling is the number of components along the optical axis within the optical cavity necessary for realizing a certain type of laser action. For example, in providing a giant pulse type laser, a Q-spoiling means as well as polarizing means is normally provided and these obstructions interfere with proper air flow for cooling purposes. If some of these components could be removed from the direction of air flow, more efficient cooling could be realized.

With the foregoing considerations in mind, it is a primary object of the present invention to provide a laser system in which air cooling may be provided by miniature type blowers and wherein the geometry is such that sufficient cooling results to provide a practicable portable laser system.

More particularly, it is an object to provide a laser system wherein air cooling is provided, the cooling air itself being directed along or parallel to the opitcal axis of the material to effect maximum cooling, normally present obstructions being removed from the path of air flow and yet being still effective in the optical cavity.

Briefly, these and other objects and advantages of this invention are attained by providing a low threshold laser material, preferably yttrium aluminum garnet as the host crystal doped with neodymium together with a light pump means and first and second regenerative means exhibiting high reflectance coupled to the material to define an optical cavity. An optical diverting means, preferably a right angle Rochon prism, is disposed along the optical axis of the laser material for diverting stimulated emission laterally to one of the regenerative means whereby a generally L shaped optical cavity is defined. An enclosure such as a plenum type chamber surrounds the optical diverting means, laser material and light pump means so that the portion of the L shaped optical cavity coincident with the optical axis of output radiation from the material is enclosed with one of the regenerative means exterior of the chamber. With this arrangement, a blower means may be disposed in the chamber and direct air through the enclosure in a direction parallel to the optical axis to thereby effect optimum cooling.

The Rochon prism simultaneously effects polarization of the stimulated emission diverted from the chamber so that the only additional component for providing giant pulses in the system constitutes a Q-spoiler. This Q-spoiler may be disposed in the exterior portion of the optical cavity between the prism and the exterior regenerative means so that minimum components are aligned with the direction of air flow in the chamber and with the optical axis of the laser material itself.

Since the air flow can be directed parallel to the optical axis of the laser material, miniature type blowers can be employed so that a lighter weight portable laser transmitter results.

A better understanding of the invention will be had by now referring to the accompanying drawing, in which:

The single figure schematically illustrates in cutaway perspective view the air-cooled laser system of this invention.

Referring to the drawing, there is shown an elongated cylindrically shaped enclosure 10 defining part of a plenum chamber. As shown, the enclosure includes an extended portion 11 surrounding a laser material in the form of a rod 12. An optical pumping means in the form of an elongated Xenon flashlamp 13 is disposed with its longitudinal axis parallel to the optical axis A of the laser rod 12. A semicylindrically shaped filter 14 for ultraviolet light is disposed between the flashlamp 13 and rod 12 as shown. The extended portion of the chamber indicated at 11 includes a highly reflective inner surface so that maximum light coupling from the lamp 13 to the rod 12 is realized.

Energy for the lamp 13 is provided through leads 15 and 16 from a suitable light pump source designated 17.

A first regenerative means in the form of a dielectric coating 18 on the end of the laser rod 12 functions as a partially reflecting and partially transmitting mirror defining one end of the optical cavity for the system and serving to couple out the output laser beam from the rod 12. The stimulated emission along the axis A within the optical cavity is diverted by an optical diverting means in the form of a right angle Rochon prism 19 towards a second regenerative means in the form of a 100% reflecting end mirror 20. By utilizing the prism 19, the optical cavity for the laser is thus L-shaped with a portion of the cavity exterior of the surrounding enclosure 10. The laser portion of the system itself is completed by a Q-spoiler 21 positioned between the prism 19 and the second regenerative means 20 exterior of the surrounding enclosure 10.

A miniature blower 22 is secured to one end of the chamber 10 and directs air flow out the other open end 23 of the extended portion of the chamber 11. The direction of air flow indicated by the arrows 24 is thus parallel or along the optical axis A of the laser rod. Further, this direction of air flow is parallel to the elongated axis of the flashlamp 13 and the axis of the semicylindrically shaped filter 14 so that maximum cooling of these elements along with the laser rod 12 is assured.

The use of the right angle Rochon prism 19 has two distinct advantages. First, the prism serves to divert stimulated emission in the optical cavity in a lateral direction exterior of the chamber so that the air flow 24 may be directed parallel to the optical axis to effect maximum cooling as described. Second, the right angle Rochon prism 19 automatically polarizes the stimulated emission diverted from the chamber so that no additional polarizing component is necessary for proper operation of the Q-spoiler 21. In this respect, there are several low threshold type laser materials in which the stimulated emission is not polarized by the host crystal itself. Such materials require an additional polarizing component for cooperation with the Q-spoiler which may constitute a Kerr or Pockels cell. The single prism thus performs dual functions.

In operation, the rod 12 is pumped from the light source 13 to effect the usual inverted population state of the laser ions between given energy levels. During this pumping and throughout operation of the system, the blower 22 is operated continuously to effect proper cooling. The Q-spoiler 21 spoils the Q of the cavity permitting a greatly increased inverted population level of lasing ions to be established before "firing" of the laser. This "firing" or generation of a giant pulse is triggered by switching the Q-spoiler 21 in the usual manner to restore the cavity of the Q. The falling back of the lasering ions between the given energy level results in stimulated emission which is caused to oscillate in the optical cavity defined between the end mirrors 18 and 20 in the usual manner. The process is repeated to provide giant output pulses at a rate of substantially ten per second, by way of example, through the dielectric partially transmitting coating 18 along the optical axis A from the end of the extended chamber portion 11.

By use of the prism 19, as described, the Q-spoiler 21 and regenerative end mirror 20 may be disposed exterior of the chamber so that there are minimum obstructions to the air flow path along the optical axis of the laser. In addition, the polarizing characteristic of the prism 19 itself eliminates the need of a further polarizing component for use with the Q-spoiler 21. It will be understood, of course, that the chamber 10 includes a suitable window for permitting the diverted emission to pass laterally from the chamber. This window is not shown in view of the cutaway portion of the enclosure.

The foregoing system has been successfully operated wherein the laser material constituted a host crystal of yttrium aluminum garnet doped with neodymium ions. It is also feasible for the system to operate with glass material doped with neodymium, both of these laser materials having a low threshold so that air cooling is feasible. In the experimental set-up employing yttrium aluminum garnet as the host crystal doped with neodymium, with a Pockels cell Q-spoiler, ten pulses per second were generated.

From the foregoing description, it will thus be evident that the present invention has provided an improved laser system wherein the various objects set forth are fully realized.

What is claimed is:

1. In a laser system including a laser material, light pump means, and first and second regenerative means exhibiting high reflectance optically coupled to said material to define an optical cavity, the combination comprising: an optical diverting means disposed along the optical axis of said laser material for diverting stimulated emission laterally to one of said regenerative means whereby a generally L-shaped optical cavity is defined; an enclosure surrounding said optical diverting means, laser material, and light pump means so that the portion of said L-shaped optical cavity coincident with the optical axis of output radiation from said material is enclosed and said one of said regenerative means is exterior of said enclosure; and blower means for passing air through said enclosure in a direction parallel to said optical axis along the enclosed portion of said optical cavity to cool said material and light pump means.

2. The combination of claim 1, in which said optical diverting means comprises a right angle Rochon prism whereby the radiation diverted by said prism is polarized; and Q-spoiling means positioned exterior of said enclosure between said prism and said one of said regenerative means.

3. A laser system including, in combination: a laser material; optical pumping means coupled to said material for effecting an inverted population state of laser ions in said material between given energy levels; first and second regenerative means exhibiting high reflectance optically coupled to said laser material to define an optical cavity for stimulated emission of radiation; optical diverting means disposed in said optical cavity along the optical axis of said laser material for diverting said stimulated emission of radiation laterally from said optical axis of said laser material to said second regenerative means whereby a generally L-shaped optical cavity is defined; an enclosing chamber means surrounding that portion of said optical cavity aligned with said optical axis such that said laser material, optical pumping means, and optical diverting means are disposed within said chamber, said first regenerative means being partially reflective to couple stimulated emission out of said cavity and end of said chamber to provide an output laser beam; and blower means for directing a flow of air through said chamber in the direction of the optical axis of said laser material to provide cooling therefor.

4. A system according to claim 3, in which said optical diverting means comprises a right angle Rochon prism in said chamber for passing said stimulated emission out of a side of said chamber at a right angle to said optical axis and simultaneously polarizing said radiation, said second regenerative means comprising a substantially 100% reflecting mirror disposed exterior of said chamber in a position to reflect said radiation back toward said prism; and a Q-spoiling means positioned exterior of said chamber between said prism and reflecting mirror and responsive to said radiation after polarization by said prism to spoil the Q of said optical cavity and periodically restore said Q upon switching to enable the generation of giant laser pulses of radiation for emission from said end of said chamber through said first regenerative means.

5. A system according to claim 4, in which said laser material is in the form of a solid rod defining a host crystal doped with neodyminum, the axis of said rod defining said optical axis, said optical pumping means comprising an elongated Xenon flashlamp disposed in spaced parallel relationship to said rod and including an ultraviolet filter means in the form of a semicylindrical section between said flashlamp and rod, the portion of said chamber means surrounding said lamp and rod having a highly reflective interior wall surface, whereby the longitudinal axes of said rod, lamp, and filter are all parallel to the direction of air flow through said chamber to thereby be subject to maximum cooling.

6. A system according to claim 5, in which said host crystal is yttrium aluminum garnet.

7. A system according to claim 5, in which said host crystal is glass.

References Cited

UNITED STATES PATENTS

| | | |
|---|---|---|
| 3,209,281 | 9/1965 | Colgate et al. |
| 3,293,564 | 12/1966 | Fan. |
| 3,307,448 | 3/1967 | Stimler et al. |
| 3,310,753 | 3/1967 | Burkhalter. |
| 3,311,845 | 3/1967 | Koester. |
| 3,319,183 | 5/1967 | Lempicki et al. |
| 3,369,101 | 2/1968 | Di Curcio. |
| 3,387,227 | 6/1968 | Mastrup et al. |
| 3,391,281 | 7/1968 | Eerkens. |
| 3,405,372 | 10/1968 | Brecher et al. |
| 3,210,687 | 10/1965 | Boyd et al. |

FOREIGN PATENTS 1,028,643  5/1966  Great Britain.

RONALD L. WIBERT, Primary Examiner

E. BAUER, Assistant Examiner